US006965096B2

(12) United States Patent
Wang

(10) Patent No.: US 6,965,096 B2
(45) Date of Patent: Nov. 15, 2005

(54) SAFETY ELECTRIC HEATING COOKER

(76) Inventor: Dong-lei Wang, No. 1 Jinfeng Road, Tangjiawan Town, Xiangzhou District, Zhuhai City, Guangdong Province (CN)

( * ) Notice: Subject to any disclaimer, the term of this patent is extended or adjusted under 35 U.S.C. 154(b) by 0 days.

(21) Appl. No.: 10/806,577

(22) Filed: Mar. 22, 2004

(65) Prior Publication Data

US 2005/0082272 A1 Apr. 21, 2005

(30) Foreign Application Priority Data

Oct. 20, 2003 (CN) ...................... 200320117133 U
Oct. 20, 2003 (CN) ...................... 200320117134 U

(51) Int. Cl.[7] ........................... A47J 27/00; A47J 37/12
(52) U.S. Cl. ........................ 219/429; 219/432; 99/418; 99/403
(58) Field of Search ................................ 219/429, 432, 219/433; 99/418, 403; 220/573.1, 573.3

(56) References Cited

U.S. PATENT DOCUMENTS

| | | | | |
|---|---|---|---|---|
| 2,863,037 | A * | 12/1958 | Johnstone | 219/432 |
| 5,400,700 | A * | 3/1995 | Bois | 99/403 |
| 5,794,522 | A * | 8/1998 | Bois et al. | 99/403 |
| 6,002,111 | A * | 12/1999 | Beugnot et al. | 219/433 |
| 6,262,398 | B1 * | 7/2001 | Busquets et al. | 219/429 |
| 6,498,323 | B1 * | 12/2002 | Robertson et al. | 219/433 |

* cited by examiner

*Primary Examiner*—Joseph Pelham
(74) *Attorney, Agent, or Firm*—Colin P. Cahoon; Carstens & Cahoon, LLP

(57) ABSTRACT

This invention discloses a safety electric heating cooker comprises an outer shell and a cooker bowl, wherein, said cooker further comprises interlaid backstops which are made of heat-resistant materials; said backstops are installed between said outer shell and said cooker bowl, whereby air gap is generated between said outer shell and said cooker bowl. Therefore, the outer shell doesn't contact with the hot cooker bowl directly, which prevents the outer shell from melting by heat. The present invention is applicable to kitchen apparatus such as electric frying pans, electric saucepots, etc.

3 Claims, 4 Drawing Sheets

SAFETY ELECTRIC HEATING COOKER

BACKGROUND OF THE INVENTION

1. Technical Field

This invention relates to a safety electric heating cooker, and more particularly, to the structure of a safety electric heating cooker.

2. Background of the Invention

A safety electric heating cooker, such as an electric frying pan, an electric saucepot, includes an outer shell and a cooker bowl. The outer shell equipped with heaters inside is made of plastics which is not heat-resistant, while the cooker bowl is for accommodating and heating food, of which the temperature is rather high during cooking. In prior art, the outer shell contacts directly with the cooker bowl. If the outer shell is made of common material, it will not pass the safety criterion since it can not resist the high temperature of the cooker bowl. If the outer shell is made of heat-resistant material, the production cost will be rather high.

SUMMARY OF THE INVENTION

The main object of the present invention is to provide a safety electric heating cooker, which has a decreased production cost and an increased safety performance.

The safety electric heating cooker according to the present invention comprises an outer shell and a cooker bowl, wherein, said cooker further comprises interlaid backstops which are made of heat-resistant materials; said backstops are installed between said outer shell and said cooker bowl, whereby air gap is generated between said outer shell and said cooker bowl.

Said backstops may be a ring installed on said outer shell.

Said backstops may be constructed by at least two pieces of blocks installed on said outer shell.

Said backstops may be installed on the top of said outer shell, and the top brim of said cooker bowl is folded outwards, by which said cooker bowl is hanged on said backstops.

Said cooker bowl is shrunk radially at its bottom part which is in the shape of a step or a conical cylinder, said backstops are installed on the inner surface or at the bottom of the inner surface of said outer shell correspondingly, said cooker bowl is supported on said backstops.

By interlaying heat-resistant backstops between said outer shell and cooker bowl, considerable air gap is generated between said outer shell and said cooker bowl, wherein air flows smoothly. Thereby, the outer shell doesn't contact with the hot cooker bowl directly, which prevents the outer shell from melting by heat.

The present invention overcomes the shortcomings of the prior art, decreases the production cost and increases the safety performance. The present invention is applicable to kitchen apparatus such as electric frying pans, electric saucepots, etc.

DETAILED DESCRIPTION OF THE PREFERRED EMBODIMENTS

Embodiment 1

Figure 1:
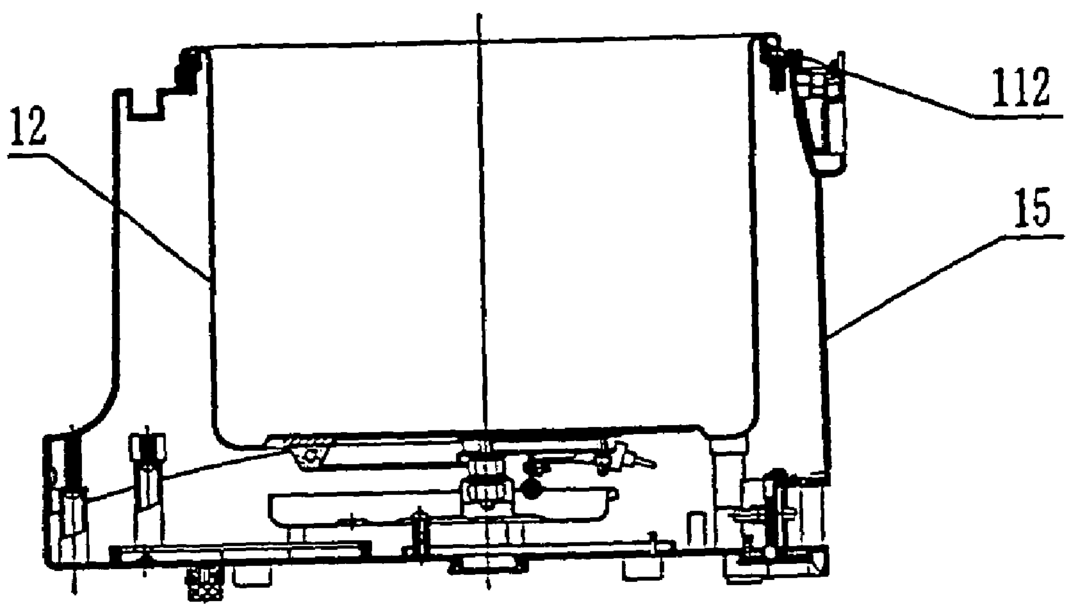
FIG. 1 shows the schematic view of the first embodiment of the safety electric heating cooker according to the present invention.
Figure 2:
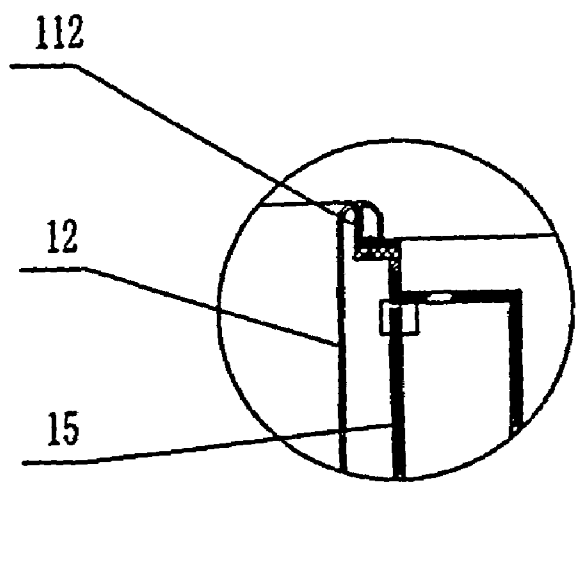
FIG. 2 is a partial enlarged view of FIG. 1.

As shown in FIG. 1 and FIG. 2, in the first embodiment, the safety electric heating cooker includes a cooker bowl 12, an outer shell 15 and the backstop.

The backstop may be made of metal. It may be a separate part and in the form of a ring 112. Said metal ring 112 is installed on the top of the inner surface of the outer shell 15. The top brim of the cooker bowl 12 is folded outwards and hanged on the backstop 112, thereby, air gap is generated between the outer shell 15 and the cooker bowl 12. Alternatively, said backstop may be constructed by at least two pieces of blocks which are distributed annularly. Said backstop 112 is connected to said cooker bowl 12 by screw.

Figure 3:
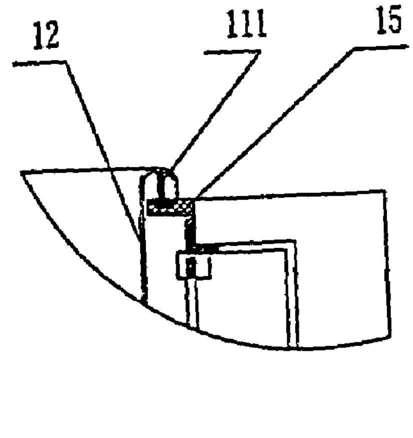
FIG. 3 is the schematic view illustrating another kind of backstops of the first embodiment of the safety electric heating cooker according to the present invention.
Figure 4:
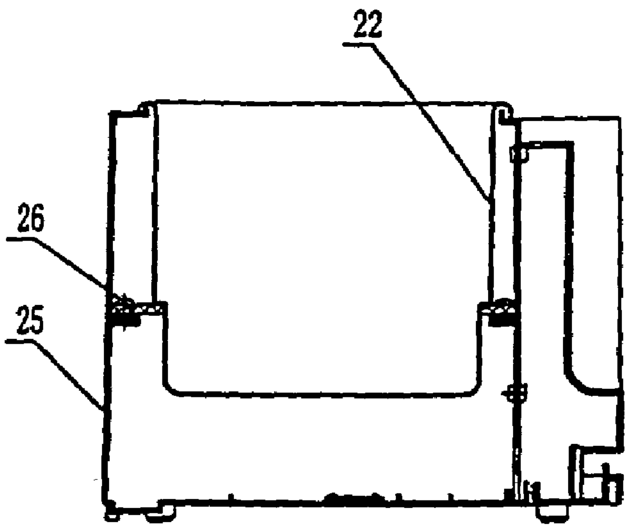
FIG. 4 is a schematic view of the second embodiment of the safety electric heating cooker according to the present invention illustrating the step-shaped cooker bowl.
Figure 5:
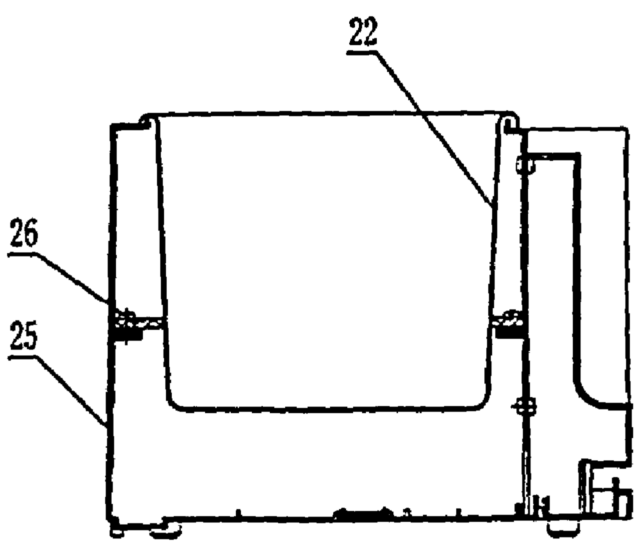
FIG. 5 is a schematic view of the second embodiment of the safety electric heating cooker according to the present invention illustrating the cooker bowl which is in the shape of a conical cylinder.
Figure 6:
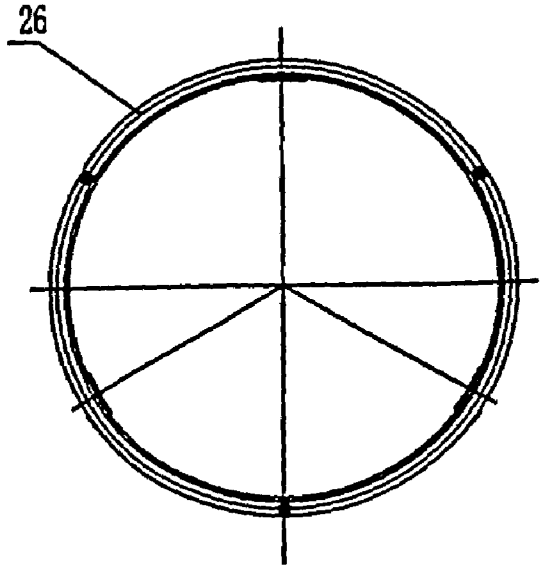
FIG. 6 is a schematic view showing the ring-shaped backstop of the safety electric heating cooker according to the present invention.
Figure 7:
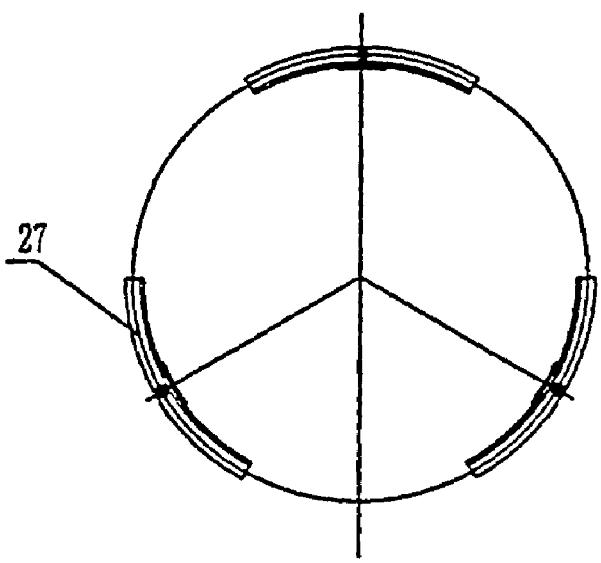
FIG. 7 is a schematic view showing the annually distributed backstops of the safety electric heating cooker according to the present invention.

As shown in FIG. 3, the backstop may be made of heat-resistant plastics. It may be a heat-resistant plastic ring, or be constructed by at least two pieces of blocks 111 which are distributed annularly. The backstop is integrated to the outer shell 15 by twice molding, so as to be convenient for assembling. The top brim of the cooker bowl 12 is folded outwards and hanged on the pieces of backstops 111, thereby, air gap is generated between the outer shell 15 and the cooker bowl 12.

Embodiment 2

As shown in FIGS. 4, 5, 6 and 7, in the second embodiment, the safety electric heating cooker includes a cooker bowl 22, an outer shell 25 and the backstop.

The cooker bowl 22 is shrunk radially at its bottom part which is in the shape of a step or a conical cylinder. Said heat-resistant backstop may be in the form of a ring 26 or constructed by at least two pieces of backstops distributed annularly. Said backstop is installed at the inner surface and preferably at the bottom of the inner surface of the outer shell. Said cooker bowl 22 is supported by the heat-resistant backstop on its step or on the surface of the conical cylinder. Air gap is generated between the outer shell 25 and the cooker bowl 22, whereby prevents the outer shell 25 from contacting directly with the hot cooker bowl 22.

Either the ring-shaped backstop 26 or the block-like backstops 27 may be used in the cooker bowl 22 which is in the shape of a step or a conical cylinder.

What is claimed is:

1. A safety electric heating cooker comprises an outer shell, a cooker bowl and interlaid backstops which are made of heat-resistant materials; said backstops are installed between said outer shell and said cooker bowl, wherein said backstops may be installed on the inner surface or at the bottom of the inner surface of said outer shell; said cooker bowl is shrinked radially at its bottom part which is in the shape of a step or a conical cylinder, and said cooker bowl is supported on said backstops.

2. A safety electric heating cooker according to claim 1, wherein said backstops may be a ring installed on said shell.

3. A safety electric heating cooker according to claim 1, wherein said backstops may be constructed by at least two pieces of blocks annularly distributed on said outer shell.

* * * * *